Sept. 11, 1973 L. TOTH 3,758,345
AUXILIARY BATTERY FOR MOTOR VEHICLES
Filed Nov. 9, 1971
2 Sheets-Sheet 2

3,758,345
AUXILIARY BATTERY FOR MOTOR VEHICLES

Laszlo Toth, Budapest, Hungary, assignor to Transelektro Magyar Villamossagi Kulkereskedelmi Vallalat, Budapest, Hungary
Filed Nov. 9, 1971, Ser. No. 198,010
Claims priority, application Hungary, Nov. 20, 1970, TO–831
Int. Cl. H01m 39/00
U.S. Cl. 136—181　　　　　　　　　　　　　　5 Claims

ABSTRACT OF THE DISCLOSURE

An electric storage battery for motor vehicles is composed of two subunits which are a main storage battery and an auxiliary storage battery. Both subunits are interconnected by a switch which, in one operational position, disconnects the auxiliary battery from the main battery and connects it directly to ignition terminals of the ignition system of a motor vehicle. Thus, the spark plugs of the engine receive the full voltage of the electric storage battery undiminished by voltage drops such as caused by operating the electric starting motor of the system. Thereby, the disadvantage of starting difficulties experienced with motor vehicles having normal electric storage batteries in cold weather is successfully avoided. The main unit has U-shaped plates, and these define a recess in which the auxiliary unit is received.

---

As is known, one of the greatest disadvantages with known lead storage batteries used for starting motor cars is that in case of medium charge, cooling down or increased resistance of the engine (which is a characteristic feature of winter operation) the electric starter means a shorting of the poles of the battery at the moment of switching on, and a significant drop of the nominal output voltage.

In the above circumstances, the ignition coil which is connected to the starter system cannot produce a sufficiently hot spark in the cylinder. For cold-starting of a car, it would be necessary to have a more intensive ignition than under normal operating conditions.

The main object of the invention is to eliminate these drawbacks in the car battery. According to the invention, an auxiilary storage cell or battery is arranged in the electrolytic chamber of a conventional motor car battery which is unchanged as to its manufacturing process and structure.

The series connection of the auxiliary storage cell and the establishment of the rated voltage at the same level as that of the basic battery is effected in a known manner. Thus, a basic battery system is obtained having the same voltage level as the motor car battery; its capacity, however, is only a fraction thereof.

The auxiliary storage battery may be outside the electrolytic chamber of the basic motor car battery and, for that purpose, a special, dry chargeable auxiliary battery is provided having the same voltage level as the rated voltage of the basic motor car battery.

The above mentioned units form twin battery systems and are connected together by the armatures of a suitable micro-switch. A functional unit obtained in this manner enables the basic power battery to be disconnected from the auxiliary battery at the moment of switching on the starter system of the car and the auxiliary battery supplies a rated voltage to the ignition system by means of the distributor of the car, independently of the voltage drop caused by the electric starter.

Any kind of motor cars may be provided with the battery according to the invention, without the need of modification, on the basis of a connection diagram displayed on the microswitch. The original distributor wire is to be connected to the microswitch whereas the output wire thereof is to be connected to the distributor. Then, the operating wire of the contactor of the system is to be connected to the operating armature of the starter.

Thus, the invention is concerned with an electric storage battery means which comprises, in combination, a main battery having a casing, battery plates in said casing, and ignition connection means on said casing while said battery plates are provided with recesses which—in operational position of the battery means—form a compartment. According to the main feature of the invention, this compartment encompasses an auxiliary battery consisting of a container with battery plates therein. Furthermore, a switch means is provided between said main battery and said auxiliary battery for disconnecting said auxiliary battery from said main battery and connecting it directly to said ignition connection in one operational position of said storage battery means. The compartment for accommodating the auxiliary battery may be confined by the legs of U-shaped battery plates of the main battery. Moreover, both the main battery and the auxiliary battery may have a common electrolyte chamber. In such case, the container accommodating the auxiliary battery may be provided with passages for permitting the flow of the electrolyte in the common electrolyte chamber.

Further details of the invention will be described by reference to the accompanying drawings which show, by way of example, exemplified embodiments of the invention and in which.

The same reference characters refer to similar details throughout the drawing.

Figure 1:
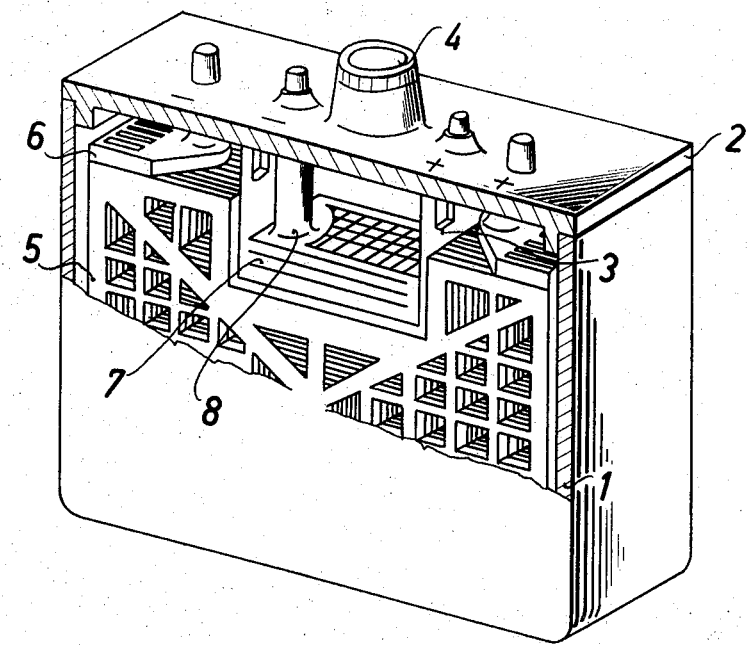
FIG. 1 is a perspective view of an exemplified embodiment.

The storage battery means shown in FIG. 1 is provided with an auxiliary storage battery or cell arranged in a battery casing 1 sealed by a cover plate 2 and separated electrically from a main battery 5 by a housing 3 fitted in a recess formed by the lead plates of the main battery 5 and having a common electrolytic chamber with the auxiliary battery 8 having lead plates 7. Thus, the two batteries 5 and 8 may be charged together, yet discharged separately, independently of loads.

The housing 3 is made of acid-proof insulation material and is fitted in the compartment formed by recesses in the lead plates of the main battery 5. This housing 3 encloses the accumulator plates 7 of the auxiliary storage battery or cell 8. The walls of the housing 3 are perforated. Such perforations may be formed by bores of small diameters in the bottom and at the corners as well as at the top edge of the housing 3.

Positioning and dimensioning of the holes has to ensure a suitable flow of the electrolyte without disturbances between the ion fluxes of the main battery 5 and that of the auxiliary storage cell 8.

The auxiliary storage cell 8 can be arranged within a main battery 5 of the normal volume of a known motor car battery without capacity decrease since the lead plates in the main battery are not thicker than 1.2 millimeter.

Figure 2:
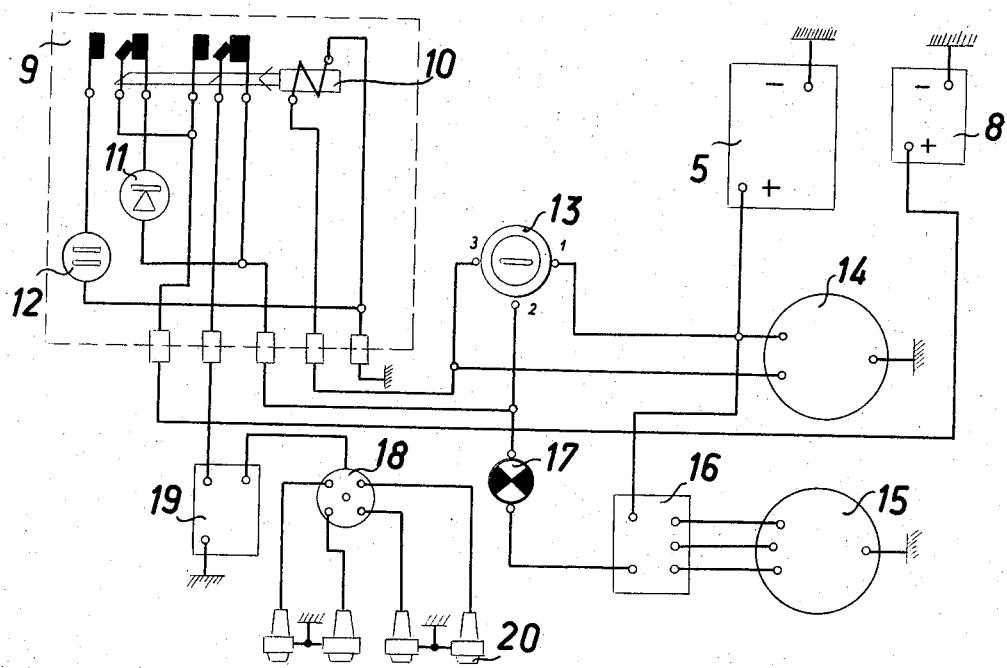
FIGS. 2 and 3 are connected diagrams of two exemplified embodiments of the invention.

The battery means according to the invention is connected by means of a switch means or unit 9 to the conventional power circuit of a motor car comprising an ignition key 13, a starter 14, a generator 15, a voltage control 16, a battery charging indicator 17, a distributor head 18 and an ignition coil 19 with ignition plugs 20 (FIG. 2).

The switch means 9 comprises a switch-over relay 10, a separator diode 11 and a buffer condenser 12.

In operation, the main battery 5 supplies an ignition voltage in the same manner as a conventional motor car battery. The generator 15 charges the main battery directly, and the auxiliary storage cell 8 via relay 10 and diode 11 of switch means 9. Diode 11 prevents the auxiliary storage cell 8 from being discharged at lower speeds of the engine. Thus, the auxiliary battery 8 is constantly in charged condition.

For starting the engine of a car, the ignition key 13 is turned so that the electric starter 14 is connected to the main battery 5 in the conventional manner. The coil of the relay 10 which is parallel connected to the starter 14 is switched over. Thus, the auxiliary storage cell 8 becomes disconnected from the main battery 5 and is connected by means of one of a pair of contacts of relay 10 via ignition coil 19 and distributor 18 to the ignition plugs 20. The other contact of relay 10 disconnects, at the same time, the ignition coil 19 from the main battery 5 while the relay 10 connects the buffer condenser 12 parallel to the auxiliary storage cell 8 which serves for filtering voltage surges due to disconnectings.

The most essential advantage of the invention is that, upon starting, ignition is supplied by an unloaded battery without other consumers on it whereby vigorous sparking will be obtained.

The auxiliary storage battery 8 may form a unit separate from the main battery 5.

Figure 3:
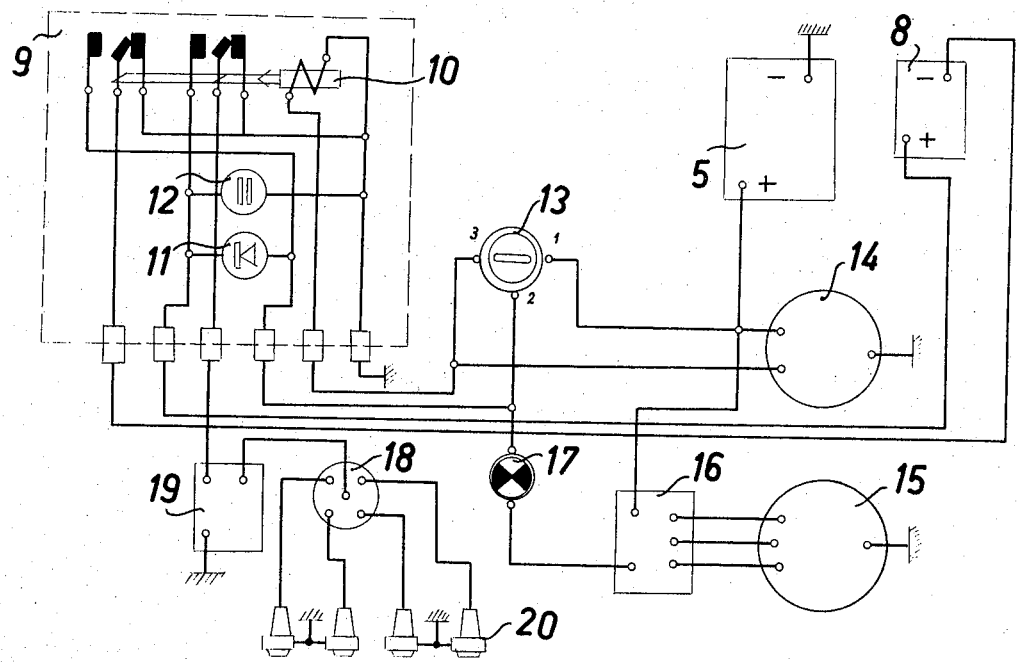

With the exemplified embodiment shown in FIG. 3, upon turning on the ignition key 13 the electric starter 14 is connected to the main battery as known per se. The coil of relay 10 which is connected parallel to the starter 14 is switched over. Thus, the terminal of the auxiliary storage cell 8 is connected, by means of one of the contacts of relay 10, to the positive terminal of the main battery 5. The ignition coil 19 is switched also by means of a contact of relay 10, from the main battery 5 to the positive terminal of the auxiliary storage cell 8. Hence, the ignition coil 19 is supplied with the overall voltage of the main battery 5 and the auxiliary storage cell 8 connected in series, and this overall voltage provides very intensive ignition sparking at the plugs 20. In the short starting time, the ignition coil 19 and the distributor 18 will not be damaged by such increased voltage.

The most significant advantage of the motor car storage battery means having a common electrolytic chamber consists in easy control of the common inlet and level control for the battery acid. The battery means can be arranged in the place of conventional motor car batteries without any modification or without further space requirement. Thereby, in relation to conventional motor car batteries of similar volume an increase of about 60% of capacity and service life can be obtained. The cells are interchangeable. Thus, the failure of one cell does not require dismantling of the whole battery means instead of which only the damaged cell is to be changed for a new one. This can be achieved easily in a few minutes and, therefore, the service time and the running loss may be small. Due to the electrolyte flow, the common electrolytic chamber maintains the auxiliary storage cell in fully charged condition even if the main battery is nearly discharged. Thus, prefectly safe and quick starting is ensured even under extreme temperature conditions (down to −40 degrees centigrade) and with the main battery 5 being so discharged that a conventional motor car could not be started by it alone.

What we claim is:

1. An electric storage battery for motor vehicles, comprising a main battery having a casing, battery plates in said casing, ignition connection means on said casing, said battery plates being U-shaped and defining between the legs of the U a recess, said recesses in said battery plates together comprising a compartment, an auxiliary battery in said compartment between the legs of said U-shaped plates, and switch means between said main battery and said auxiliary battery for disconnecting said auxiliary battery from said main battery and connecting said auxiliary directly to said ignition connection in one operational position of said storage battery.

2. A battery as claimed in claim 1, and a housing for said auxiliary battery, said housing being disposed in said recesses.

3. A battery as claimed in claim 2, said housing having openings therethrough for the flow of electrolyte between said main and auxiliary batteries.

4. A battery as claimed in claim 2, said casing having a removable cover common to said main and auxiliary batteries.

5. A battery as claimed in claim 4, said housing being mounted on the underside of said cover.

References Cited

UNITED STATES PATENTS

| 3,200,014 | 8/1965 | Roberts | 136—181 |
| 3,029,301 | 4/1962 | Strider | 136—181 |
| 2,913,587 | 11/1959 | Gebhard | 136—181 |

ANTHONY SKAPARS, Primary Examiner

U.S. Cl. X.R.

136—6 R